United States Patent
Park

(10) Patent No.: US 12,346,250 B2
(45) Date of Patent: Jul. 1, 2025

(54) CONTROLLER AND OPERATING METHOD THEREOF

(71) Applicant: SK hynix Inc., Icheon-si (KR)

(72) Inventor: Jeen Park, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 302 days.

(21) Appl. No.: 17/741,798

(22) Filed: May 11, 2022

(65) Prior Publication Data

US 2023/0205687 A1 Jun. 29, 2023

(30) Foreign Application Priority Data

Dec. 24, 2021 (KR) .......................... 10-2021-0186754

(51) Int. Cl.
*G06F 12/02* (2006.01)
*G06F 12/06* (2006.01)
*G06F 12/10* (2016.01)
*G06F 13/16* (2006.01)

(52) U.S. Cl.
CPC ...... *G06F 12/0238* (2013.01); *G06F 12/0246* (2013.01); *G06F 12/0623* (2013.01); *G06F 12/0653* (2013.01); *G06F 12/10* (2013.01); *G06F 13/1668* (2013.01); *G06F 2212/7201* (2013.01)

(58) Field of Classification Search
CPC ............. G06F 12/0246; G06F 12/0238; G06F 3/0679; G06F 13/1668; G06F 3/0655; G06F 3/0658
See application file for complete search history.

(56) References Cited

U.S. PATENT DOCUMENTS

| | | | | |
|---|---|---|---|---|
| 10,101,927 B2 * | 10/2018 | Kim | ...................... | G06F 3/0665 |
| 10,175,892 B1 * | 1/2019 | Kim | ...................... | G06F 3/0653 |
| 2016/0266792 A1 * | 9/2016 | Amaki | .................... | G06F 3/064 |
| 2018/0293174 A1 * | 10/2018 | Song | .................. | G06F 12/1009 |
| 2019/0361804 A1 * | 11/2019 | Park | .................... | G06F 12/0246 |
| 2023/0004303 A1 * | 1/2023 | Yang | .................... | G06F 12/0246 |
| 2023/0195646 A1 * | 6/2023 | Liu | ...................... | G06F 12/1009 |
| | | | | 711/206 |

FOREIGN PATENT DOCUMENTS

KR  20190143073 A  12/2019

OTHER PUBLICATIONS

S-FTL: An Efficient Address Translation for Flash Memory by Exploiting Spatial Locality by Jiang (Year: 2011).*
A Scalable and Highly Configurable Cache-Aware Hybrid Flash Translation Layer by Boukhobza (Year: 2014).*
NPL Dubois Memroy Access Buffering in Multiprocessors 1986.*

* cited by examiner

*Primary Examiner* — Paul M Knight
(74) *Attorney, Agent, or Firm* — Perkins Coie LLP

(57) ABSTRACT

The embodiments of the disclosed technology relate to a controller and operating method thereof. Based on some embodiments of the disclosed technology, the controller may include i) a first memory configured to store map data including a plurality of map data entries, ii) a second memory configured to store map search data indicating a first map data entry, which corresponds to a first logical address, among the plurality of map data entries, and iii) a core configured to search for information on a physical address mapped to a second logical address from the map data, based on whether the map search data is stored in the second memory.

16 Claims, 19 Drawing Sheets

CONTROLLER AND OPERATING METHOD THEREOF

PRIORITY CLAIM AND CROSS-REFERENCES TO RELATED APPLICATION

This patent document claims the priority and benefits of Korean patent application number 10-2021-0186754 filed on Dec. 24, 2021, which are incorporated herein by reference in its entirety.

TECHNICAL FIELD

The embodiments of the disclosed technology relate to a controller and operating method thereof.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read, write, and erase operations on the memory devices in the memory system. The memory controller may be used to execute firmware operations for performing a logical operation for controlling such operations.

The memory system may receive, from the host, a logical address of the memory device that data is to be read out from or written to. In addition, the memory system may identify a physical address of a physical memory location that the data is to be actually read out from or written to by mapping the logical address to the physical address based on map data.

SUMMARY

Embodiments of the disclosed technology may provide a controller and an operating method of the controller searching for a physical address corresponding to a specific logical address quickly by using previously searched mapping information between logical address and physical address.

In one aspect, the disclosed technology can be implemented in some embodiments to provide a controller including a first memory configured to store data comprising map data which includes a plurality of map data entries, wherein each of the plurality of map data entries corresponds to sequence information indicating an order of each map data entry in a sequence of the plurality of map data entries, wherein each of the plurality of map data entries indicates a corresponding logical address range including one or more contiguous logical address and whether the corresponding logical address range is mapped to a physical address range including one or more contiguous physical address or is not mapped to any physical address range, a second memory configured to store data comprising map search data indicating a first map data entry corresponding to a first logical address, among the plurality of map data entries, and a core in communication with the first memory and the second memory and configured to look up a physical address mapped to a second logical address from the map data stored in the first memory, based on whether the map search data is stored in the second memory.

In another aspect, the disclosed technology can be implemented in some embodiments to provide a method for operating a controller. The method may include determining whether map search data is stored in a target memory, the map search data indicating a first map data entry corresponding to a first logical address, out of a plurality of map data entries in map data, and searching for information on a physical address mapped to a second logical address from the map data, based on whether the map search data is stored in the target memory. Each of the plurality of map data entries corresponds to sequence information indicating an order of each map data entry in a sequence of the plurality of map data entries, and each of the plurality of map data entries indicates a corresponding logical address range including one or more contiguous logical address and whether the corresponding logical address range is mapped to a physical address range including one or more contiguous physical address or is not mapped to any physical address range.

In another aspect, the disclosed technology can be implemented in some embodiments to provide a controller including i) a first memory configured to store data comprising map data which includes a plurality of map data entries, ii) a second memory configured to store data comprising map search data indicating a first map data entry corresponding to a first logical address, among the plurality of map data entries, and iii) a core in communication with the first memory and the second memory and configured to search for information on a physical address mapped to a second logical address from the map data stored in the first memory, based on whether the map search data is stored in the second memory.

Each of the plurality of map data entries may correspond to sequence information indicating its sequence among the plurality of map data entries. Each of the plurality of map data entries may indicate a corresponding logical address range, which includes one or more contiguous logical address, is mapped to a physical address range, which includes one or more contiguous physical address, or not mapped to any physical address range.

The core may execute, when the map search data is not stored in the second memory, a logical operation to control an operation for accessing, among the plurality of map data entries, from a map data entry with the most advanced sequence information sequentially according to respective sequence information.

The core may execute, when the map search data is stored in the second memory, a logical operation to control an operation for accessing, among the plurality of map data entries, map data entries from the first map data entry to a second map data entry, which corresponds to the second logical address, sequentially according to the respective sequence information.

In another aspect, the disclosed technology can be implemented in some embodiments to provide a method for operating a controller, the method may include i) determining whether the map search data is stored in a target memory, the map search data indicating a first map data entry corresponding to a first logical address, out of a plurality of map data entries in map data and ii) searching for information on a physical address mapped to a second logical address from the map data, based on whether the map search data is stored in the target memory.

Each of the plurality of map data entries may correspond to sequence information indicating its sequence among the plurality of map data entries. Each of the plurality of map data entries may indicate a corresponding logical address range, which includes one or more contiguous logical address, is mapped to a physical address range, which includes one or more contiguous physical address, or not mapped to any physical address range.

The searching for information on a physical address mapped to a second logical address from the map data may include executing, when the map search data is not stored in the target memory, a logical operation to control an operation for accessing, among the plurality of map data entries, from an map data entry with the most advanced sequence information sequentially according to the respective sequence information.

The searching for information on a physical address mapped to a second logical address from the map data may include executing, when the map search data is stored in the target memory, a logical operation to control an operation for accessing, among the plurality of map data entries, from the first map data entry to a second map data entry, which corresponds to the second logical address, sequentially according to the respective sequence information.

In some embodiments, the disclosed technology can be implemented in some embodiments to search for a physical address corresponding to a specific logical address by using previously searched mapping information between logical address and physical address.

In another aspect, the disclosed technology can be implemented in some embodiments to provide a controller including a first memory configured to store data comprising address mapping information which includes a plurality of address mapping information entries, wherein each of the plurality of address mapping information entries corresponds to sequence information indicating an order of each address mapping information entry in a sequence of the plurality of address mapping information entries, wherein each of the plurality of address mapping information entries indicates a corresponding logical address range including one or more contiguous logical address and whether the corresponding logical address range is mapped to a physical address range including one or more contiguous physical address or is not mapped to any physical address range, a second memory configured to store data comprising mapping information search data indicating a first address mapping information entry corresponding to a first logical address, among the plurality of address mapping information entries, and a digital processing circuit in communication with the first memory and the second memory and configured to look up a physical address mapped to a second logical address from the address mapping information stored in the first memory, based on whether the mapping information search data is stored in the second memory.

In another aspect, the disclosed technology can be implemented in some embodiments to provide a method for operating a controller. The method may include determining whether mapping information search data is stored in a target memory, the mapping information search data indicating a first address mapping information entry corresponding to a first logical address, out of a plurality of address mapping information entries in address mapping information, and searching for information on a physical address mapped to a second logical address from the address mapping information, based on whether the mapping information search data is stored in the target memory. Each of the plurality of address mapping information entries corresponds to sequence information indicating an order of each address mapping information entry in a sequence of the plurality of address mapping information entries, and wherein each of the plurality of address mapping information entries indicates a corresponding logical address range including one or more contiguous logical address and whether the corresponding logical address range is mapped to a physical address range including one or more contiguous physical address or is not mapped to any physical address range.

DETAIL DESCRIPTION

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

Figure 1:
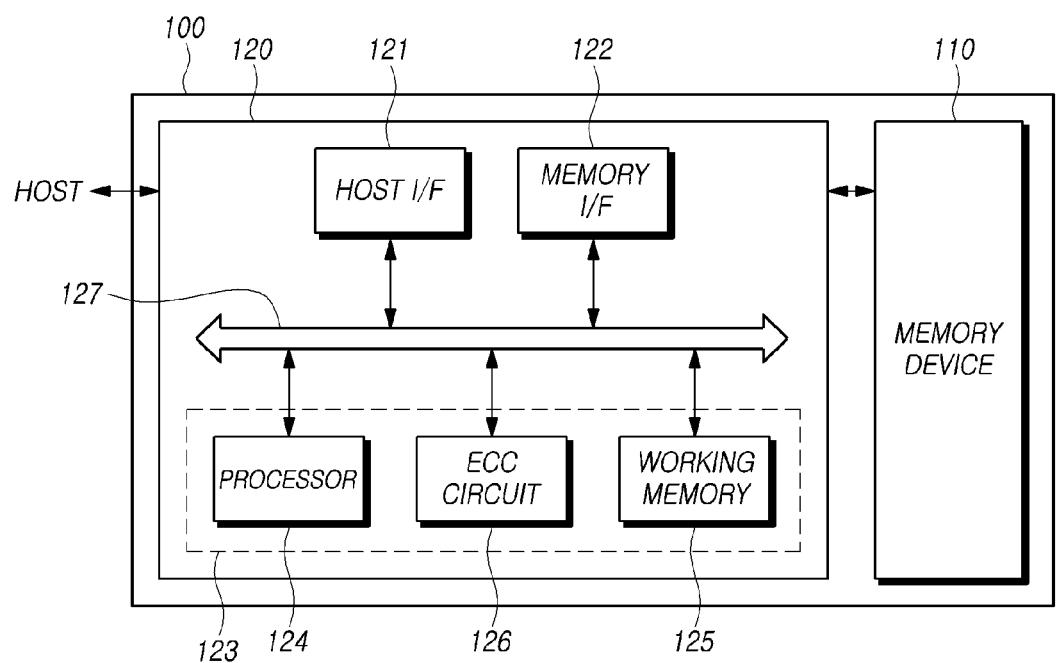
FIG. 1 is a diagram illustrating an example configuration of a memory system based on an embodiment of the disclosed technology.

FIG. 1 is a diagram illustrating an example configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable and the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
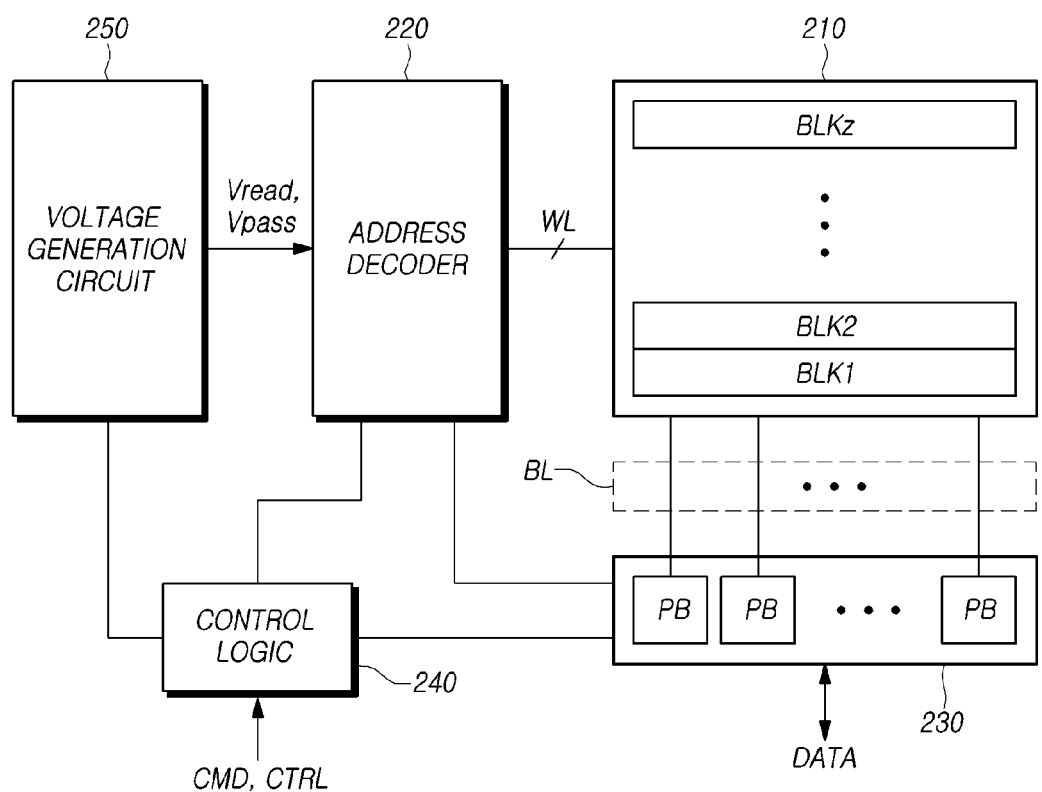
FIG. 2 is a block diagram illustrating an example of a memory device based on an embodiment of the disclosed technology.

FIG. 2 is a block diagram illustrating an example of a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
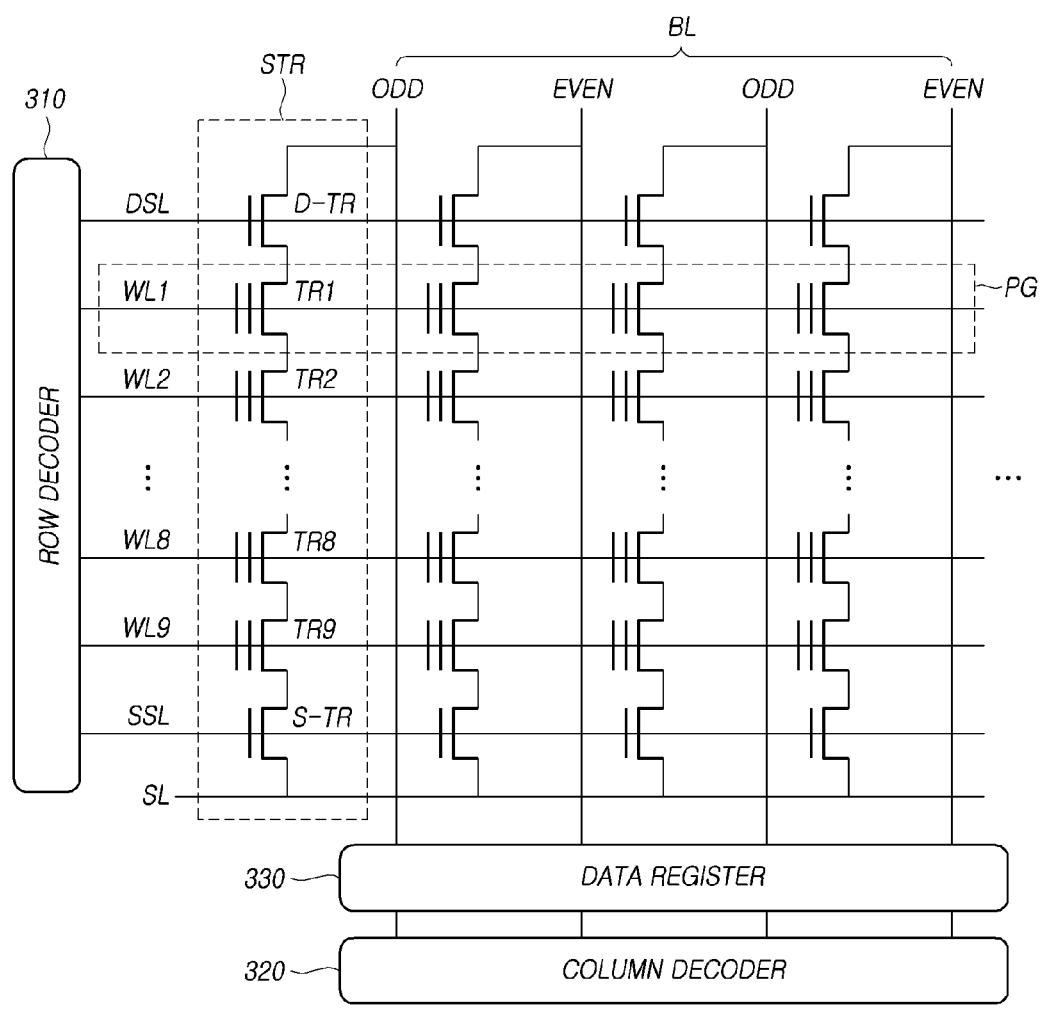
FIG. 3 is a diagram illustrating example configurations of word lines and bit lines of a memory device based on an embodiment of the disclosed technology.

FIG. 3 is a diagram illustrating example configurations of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch circuit that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
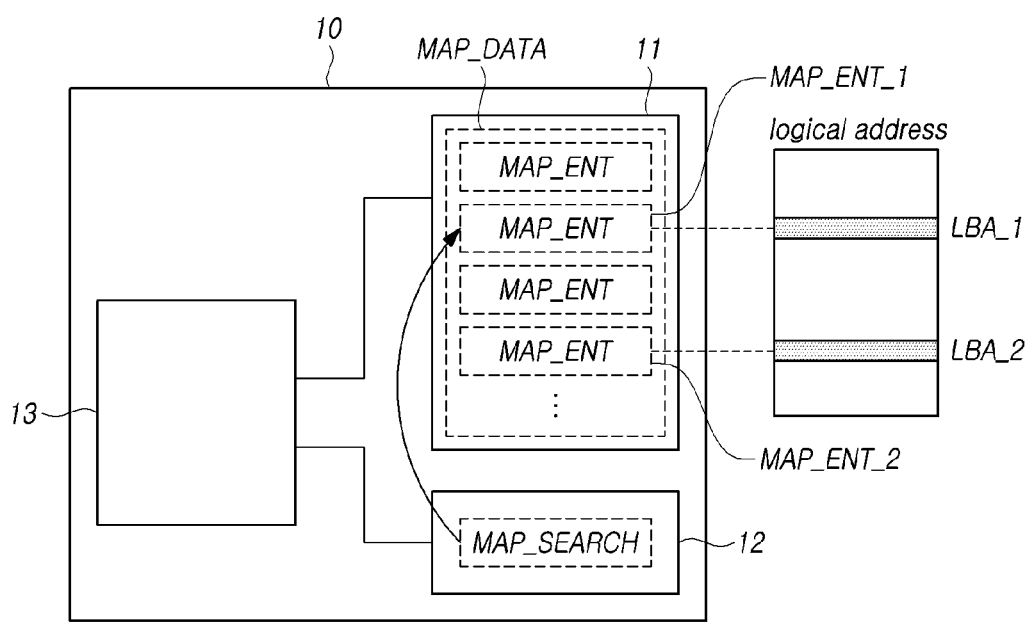
FIG. 4 illustrates an example of a controller based on some embodiments of the disclosed technology.

FIG. 4 illustrates an example of a controller 10 based on some embodiments of the disclosed technology.

Referring to FIG. 4, the controller 10 may include a first memory 11, a second memory 12 and a core 13.

The first memory 11 may store map data MAP_DATA that is used to map logical addresses and physical addresses. In some implementations, the map data MAP_DATA may include a plurality of map data entries MAP_ENT. Each of the plurality of map data entries MAP_ENT may be used to map logical addresses and physical addresses, as will be discussed below with reference to FIG. 5. In some implementations, the map data indicates mapping information that is used to map logical addresses to physical addresses.

In some implementations, the second memory 12 may store map search data MAP_SEARCH to indicate one of the plurality of map data entries MAP_ENT. In one example, the second memory 12 may store a first map data entry MAP_ENT_1 to indicate a certain logical address. The first map data entry MAP_ENT_1 is a map data entry corresponding to a first logical address LBA_1.

In an implementation, the first memory 11 and the second memory 12 may be located in different memory chips. In another implementation, the first memory 11 and the second memory 12 may be located in different regions of the same memory chip.

The core 13 includes a digital processing unit or circuit that executes instructions or performs a logical operation for controlling an operation discussed below. The core 13 may load firmware on a memory device to perform a logical operation associated with the first memory 11 and the second memory 12 and execute instructions in the loaded firmware.

The core 13 may determine whether the map search data is stored in the second memory 12. The core 13 may look up a physical address mapped to a second logical address LBA_2 from the map data MAP_DATA, in a case that the map search data is stored in the second memory 12.

For example, when the map search data MAP_SEARCH is stored in the second memory 12, the core 13 may execute a logical operation to control an operation for accessing map data entries MAP_ENT ranging from the first map data entry MAP_ENT_1 to a second map data entry MAP_ENT_2.

In some implementations, when the core 13 executes a logical operation, the core 13 directly executes an operation to access a map data entry, or the core 13 controls another hardware module to execute an operation to access a map data entry.

In one example, based on the map search data MAP_SEARCH stored in the second memory 12, the core 13 may acquire information on the location of the first map data entry MAP_ENT_1 among the plurality of map data entries MAP_ENT. In some implementations, the core 13 acquires information on a physical address mapped to the second logical address LBA_2 from the map data MAP_DATA as will be discussed below with reference to FIG. 6.

When the map search data MAP_SEARCH is not stored in the second memory 12, the core 13 may execute a logical operation to control an operation for accessing the plurality of map data entries MAP_ENT sequentially from a starting address. In some implementations, the core 13 acquires information on a physical address mapped to the second logical address LBA_2 from the map data MAP_DATA as will be discussed below with reference to FIG. 7.

In the example of an embodiment of the disclosed technology shown in FIG. 4, the values of the first logical address LBA_1 and the second logical address LBA_2 are different from each other. However, in another embodiment of the disclosed technology, the first logical address LBA_1 and the second logical address LBA_2 may have the same value.

In some embodiments of the disclosed technology, the first logical address LBA_1 may have the same value as the second logical address LBA_2 or may be accessed by the core 13 before the second logical address LBA_2 is accessed. That is, the core 13 may execute an operation (e.g., read/write/erase operation) on data corresponding to the first logical address LBA_1 first and then perform an operation on data corresponding to the second logical address LBA_2.

Similarly, in FIG. 4, in an embodiment of the disclosed technology, the values of the first map data entry MAP_ENT_1 and the second map data entry MAP_ENT_2 may be different from each other. In another embodiment of the disclosed technology, the first map data entry MAP_ENT_1 and the second map data entry MAP_ENT_2 may have the same value.

In an implementation, the controller 10 may be the memory controller 120 described with reference to FIG. 1. In this case, the first memory 11 and the second memory 12 may be part of the working memory 125 included in the memory controller 120. In another implementation, the core 13 may be the processor 124 included in the memory controller 120 or part of circuitry that performs a logical operation in the processor 124.

Figure 5:
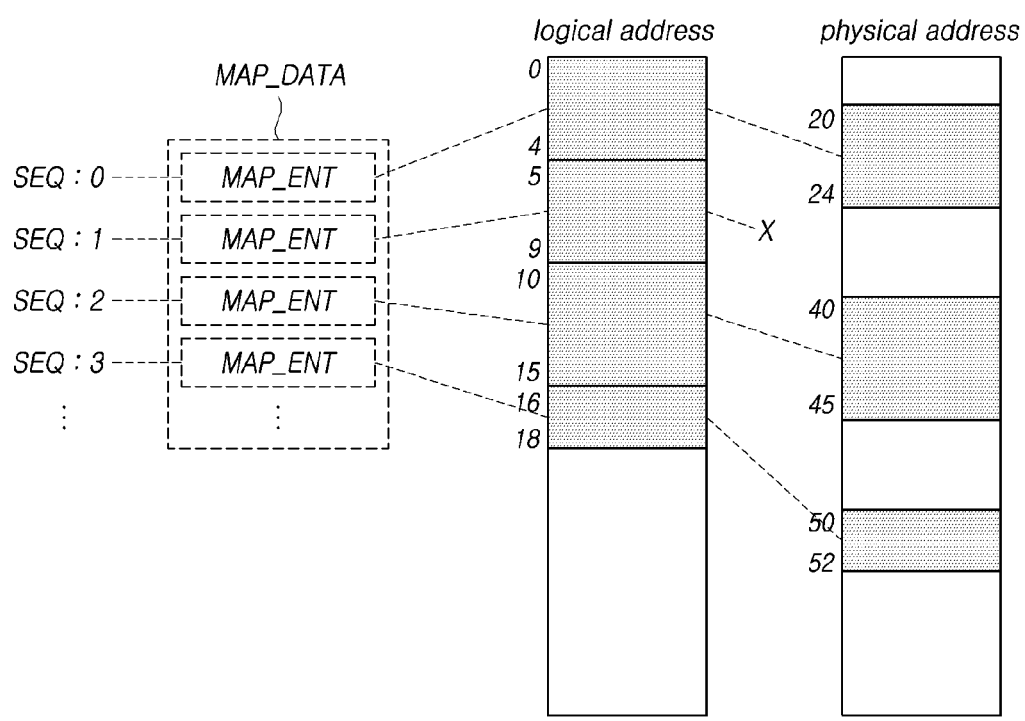
FIG. 5 illustrates an example of a plurality of map data entries based on some embodiments of the disclosed technology.

FIG. 5 illustrates an example of a plurality of map data entries MAP_ENT based on some embodiments of the disclosed technology.

Figure 8:
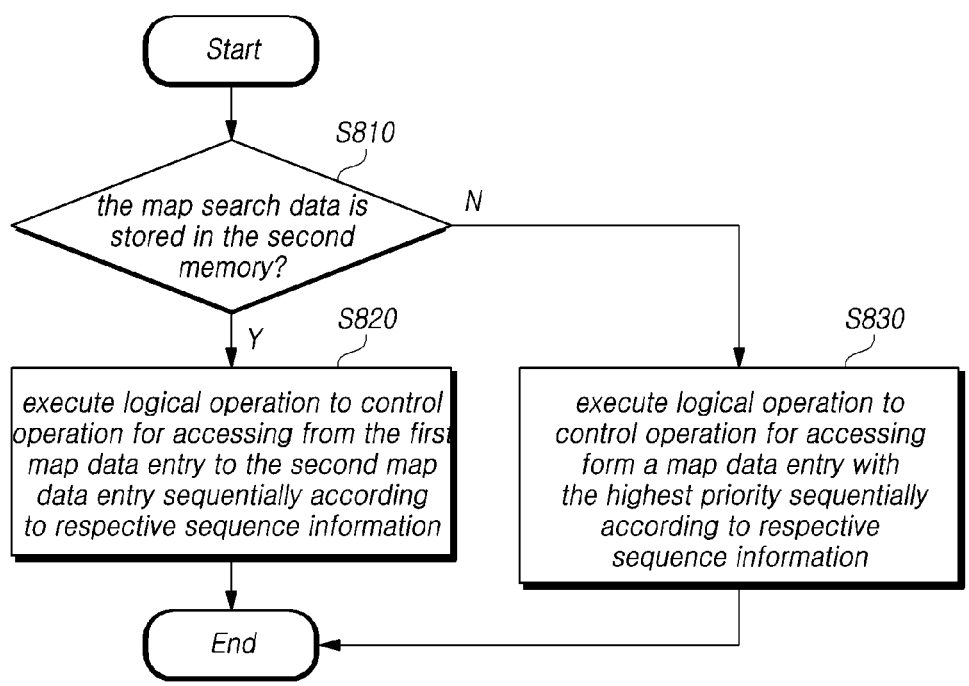
FIG. 8 illustrates an example operation of the controller for searching for information on a physical address mapped to a second logical address from map data based on whether map search data is stored in a second memory based on some embodiments of the disclosed technology.

Referring to FIG. 8, the plurality of map data entries MAP_ENT included in the map data MAP_DATA may be sequence information SEQ that indicates the sequence of the plurality of map data entries MAP_ENT.

The sequence information SEQ is used to determine, when the plurality of map data entries MAP_ENT are sequentially accessed, the sequence in which the plurality of map data entries MAP_ENT are accessed (e.g., ascending or descending order of the sequence information SEQ).

In FIG. 5, the sequence information SEQ corresponding to each of the plurality of map data entries MAP_ENT is 0, 1, 2, 3, . . . . However, in some embodiments of the disclosed technology, a specific value of the sequence information SEQ corresponding to each of the plurality of map data entries MAP_ENT is not limited to what is illustrated in FIG. 5.

In addition, each of the plurality of map data entries MAP_ENT may indicate mapping information for the logical address range corresponding to itself. Specifically, each of the plurality of map data entries MAP_ENT may indicate: i) a corresponding logical address range is mapped to a specific physical address range; or ii) a corresponding logical address range is not mapped to any physical address range.

In this case, the logical address range may include one or more logical addresses (e.g., contiguous logical address range) and the physical address range may include one or more contiguous physical addresses (e.g., contiguous physical address range).

Referring to FIG. 5, first, the map data entry MAP_ENT corresponding to the sequence information SEQ 0 indicates a logical address range including logical addresses 0 to 4 is mapped to a physical address range including physical addresses 20 to physical address 24.

The map data entry MAP_ENT corresponding to the sequence information SEQ 1 indicates that there are no physical addresses that are mapped to logical address range including logical addresses 5 to 9.

The map data entry MAP_ENT corresponding to the sequence information SEQ 2 indicates information that logical address range including logical addresses 10 to 15 is mapped to the physical address range including physical addresses 40 to 45.

The map data entry MAP_ENT corresponding to the sequence information SEQ 3 indicates information that logical address range including logical addresses 16 to 18 is mapped to the physical address range including physical addresses 50 to 52.

Figure 6:
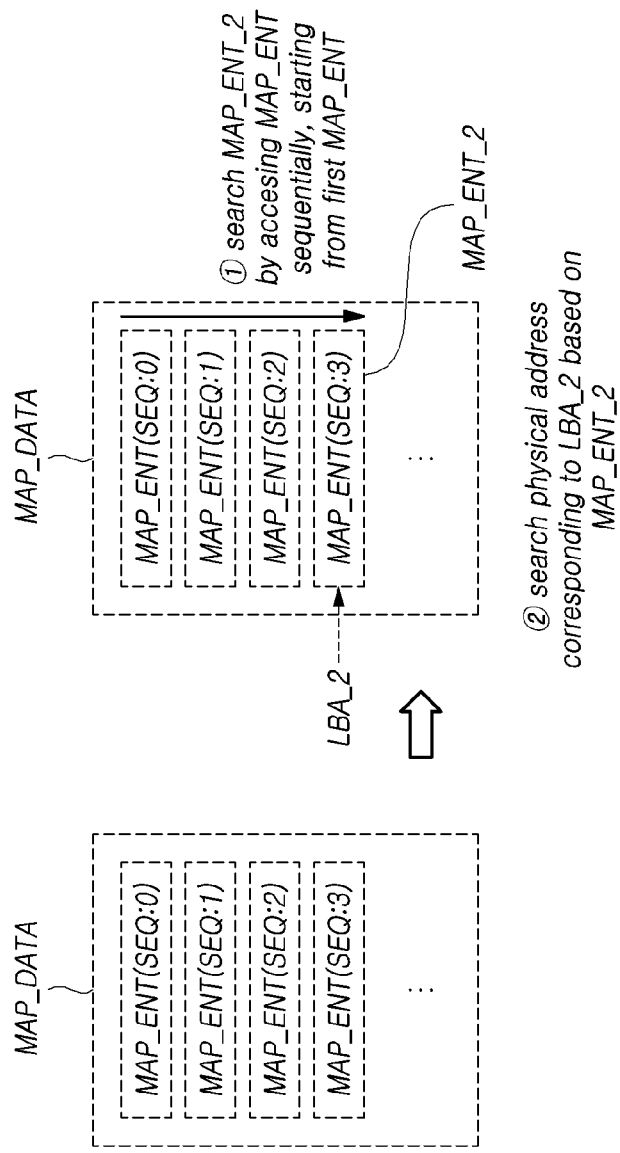
FIG. 6 illustrates an example operation of a controller for acquiring a physical address corresponding to a second logical address based on some embodiments of the disclosed technology.

FIG. 6 illustrates an example operation of the controller 10 for acquiring a physical address corresponding to a second logical address based on some embodiments of the disclosed technology.

Referring to FIG. 6, the core 13 of the controller 10 may execute a logical operation to control an operation for accessing, among the plurality of map data entries MAP_ENT, from an map data entry corresponding to the sequence information with the highest priority (e.g., sequence information the smallest value or the largest number) sequentially ("①" in FIG. 6) (e.g., in FIG. 6, in the order of SEQ 0, SEQ 1, SEQ 2, SEQ 3).

The map data entry corresponding to sequence information with the highest priority (e.g., sequence information the smallest value or the largest number) is the map data that is accessed first when all the plurality of map data entries MAP_ENT are sequentially accessed according to a predetermined sequence. An map data entry corresponding to sequence information the highest priority (e.g., sequence information the smallest value or the largest number) in FIG. 7 is an map data entry having sequence information SEQ 0.

The core 13 may execute a logical operation to control an operation for accessing map data entries from an map data entry corresponding to sequence information with the highest priority (e.g., sequence information the smallest value or the largest number) to the second map data entry MAP_ENT_2 sequentially according to the respective sequence information (e.g., ascending or descending order of sequence information).

In addition, the core 13 may look up a physical address mapped to the second logical address LBA_2 based on the second map data entry MAP_ENT_2 corresponding to the second logical address LBA_2 ("②" in FIG. 6). As shown in FIG. 5, the second map data entry MAP_ENT_2 indicates information on the physical address range mapped to the logical address range including the second logical address LBA_2. Accordingly, the core 13 may look up the physical address mapped to the second logical address LBA_2 based on the second map data entry MAP_ENT_2.

Figure 7:
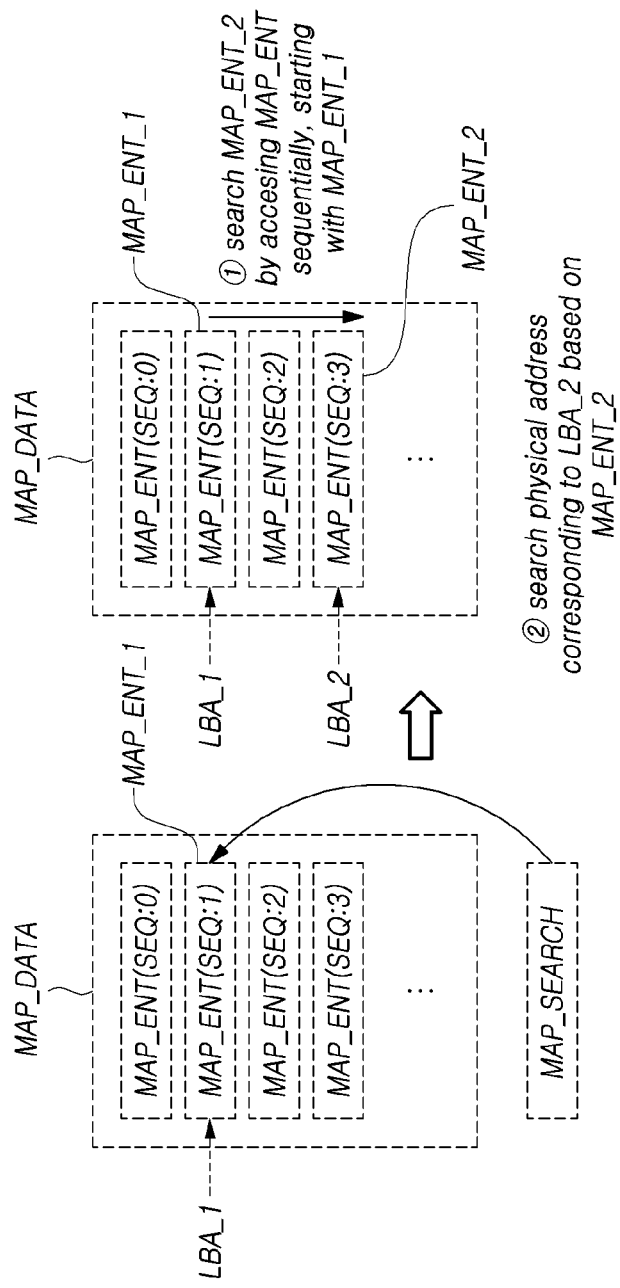
FIG. 7 illustrates another example operation of the controller for acquiring a physical address corresponding to a second logical address based on some embodiments of the disclosed technology.

FIG. 7 illustrates another example operation of the controller 10 for acquiring a physical address corresponding to a second logical address LBA_2 based on some embodiments of the disclosed technology.

Referring to FIG. 7, the core 13 of the controller 10 may determine the location of the first map data entry MAP_ENT_1, which corresponds to the first logical address LBA_1, based on the above-described map search data MAP_SEARCH.

The core 13 may execute a logical operation to control an operation for accessing, among the plurality of map data entries MAP_ENT, from the first map data entry MAP_ENT_1, which corresponds to the first logical address LBA_1, to the second map data entry MAP_ENT_2, which corresponds to the second logical address LBA_2, sequentially ("①" in FIG. 7). The core 13 may search for the second map data entry MAP_ENT_2, which indicates the physical address corresponding to the second logical address LBA_2, more efficiently by accessing, instead of accessing all the map data entries MAP_ENT from the starting address, from the first map data entry MAP_ENT_1 that has already been accessed.

In this case, the core 13 may execute a logical operation to control an operation for accessing from the first map data entry MAP_ENT_1 to the second map data entry MAP_ENT_2 sequentially (e.g., ascending or descending order of sequence information) according to the respective sequence information SEQ.

The core 13 may search for information on the physical address mapped to the second logical address LBA_2 based on the second map data entry MAP_ENT_2 corresponding to the second logical address LBA_2 ("②" in FIG. 7). As shown in FIG. 5, the second map data entry MAP_ENT_2 may indicate information on the physical address range mapped to the logical address range including the second logical address LBA_2. Accordingly, the core 13 may search for information on the physical address mapped to the second logical address LBA_2 based on the second map data entry MAP_ENT_2.

In some implementations, according to the method described above in FIG. 6, the core 13 may execute, to generate the above-described map search data MAP_SEARCH, a logical operation to control an operation for accessing, among the plurality of map data entries MAP_ENT, from an map data entry corresponding to the sequence information with the highest priority (e.g., sequence information the smallest value or the largest number) sequentially according to the respective sequence information.

FIG. 8 illustrates an example operation of the controller 10 for searching for information on a physical address mapped to a second logical address from map data based on whether map search data is stored in a second memory 12 based on some embodiments of the disclosed technology.

Referring to FIG. 8, the core 13 of the controller 10 may determine whether the map search data MAP_SEARCH is stored in the second memory 12 (S810).

When the map search data MAP_SEARCH is stored in the second memory 12 (S810—Y), the core 13 may execute, as described in FIG. 7, a logical operation to control an operation for accessing, among the plurality of map data entries MAP_ENT, from the first map data entry MAP_ENT_1 to the second map data entry MAP_ENT_2, which corresponds to the second logical address LBA_2, sequentially according to the respective sequence information (S820).

On the other hand, when the operation for searching for the information regarding the physical address mapped to the second logical address LBA_2 from the map data MAP_DATA in operation S820 fails, the core 130 may further execute logical operations to control operations for accessing, among the plurality of map data entries MAP_ENT, map data entries from the map data entry corresponding to the sequence information with the highest priority (e.g., sequence information the smallest value or the largest number) sequentially according to the respective sequence information, in order to search for the information on the physical address mapped to the second logical address LBA_2 from the map data MAP_DATA.

On the other hand, when the map search data MAP_SEARCH is not stored in the second memory 12, the core 13 may execute, as shown in FIG. 6, a logical operation to control an operation for accessing, among the plurality of map data entries, map data entries from an map data entry corresponding to the sequence information with the highest priority (e.g., sequence information the smallest value or the largest number) sequentially according to the respective sequence information (S830).

Figure 9:
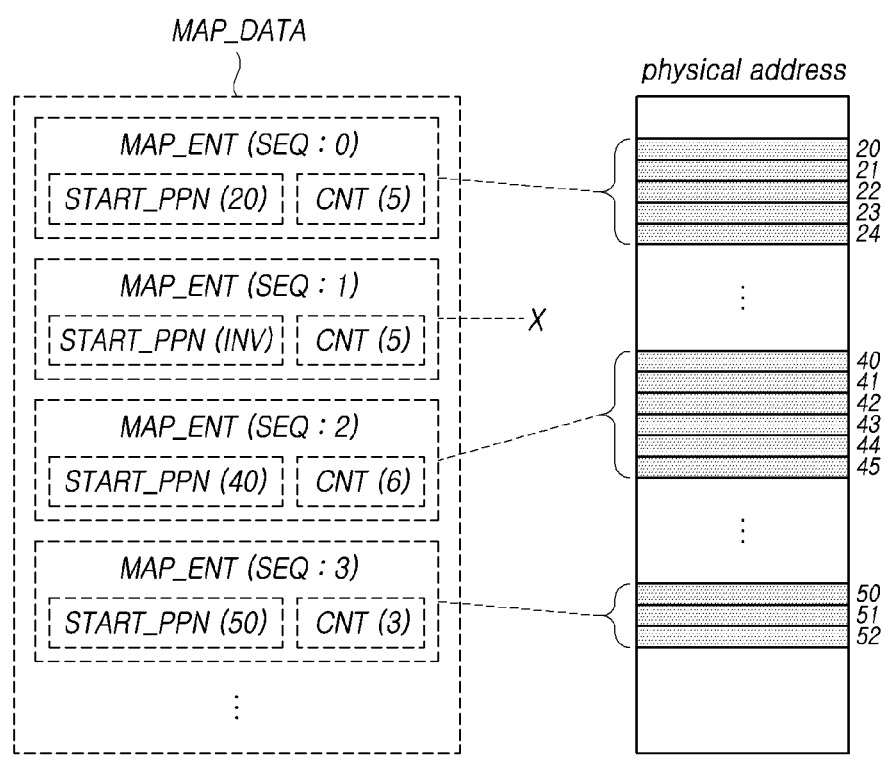
FIG. 9 illustrates an example structure of map data entry based on some embodiments of the disclosed technology.

FIG. 9 illustrates an example structure of map data entry MAP_ENT based on some embodiments of the disclosed technology.

Referring to FIG. 9, each of the plurality of map data entries MAP_ENT included in the map data MAP_DATA may include i) physical location information START_PPN indicating the validity of the physical address range corresponding to itself and a starting physical address and ii) address count information CNT indicating the number of contiguous physical addresses included in the physical address range corresponding to itself.

In FIG. 9, the map data entry MAP_ENT corresponding to the sequence information SEQ 0 may include physical location information START_PPN indicating that the starting physical address of valid physical address range corresponding to itself is 20, and address count information CNT indicating that the number of contiguous physical addresses included in the corresponding physical address range is 5. That is, the map data entry MAP_ENT corresponding to the sequence information SEQ 0 may indicate that it corresponds to an address range from physical address 20 to physical address 24, starting from physical address 20 and containing 5 contiguous physical addresses starting from physical address 20.

The map data entry MAP_ENT corresponding to the sequence information SEQ 1 may include physical location information START_PPN indicating the starting physical address of the physical address range corresponding to itself is invalid. This means that the physical address range corresponding to the map data entry MAP_ENT corresponding to the sequence information SEQ 1 is invalid.

For example, the address count information CNT indicating that the number of contiguous physical addresses included in the physical address range corresponding to the map data entry MAP_ENT corresponding to the sequence information SEQ 1 is 5 may be used to determine the logical address range corresponding to itself.

The map data entry MAP_ENT corresponding to the sequence information SEQ 2 may include physical location information START_PPN indicating that the starting physical address of valid physical address range corresponding to itself is 40, and address count information CNT indicating that the number of contiguous physical addresses included in the corresponding physical address range is 6. That is, the map data entry MAP_ENT corresponding to the sequence information SEQ 2 may indicate that it corresponds to an address range from physical address 40 to physical address 45, starting from physical address 40 and containing 6 contiguous physical addresses starting from physical address 40.

The map data entry MAP_ENT corresponding to the sequence information SEQ 3 may include physical location information START_PPN indicating that the starting physical address of valid physical address range corresponding to itself is 50, and address count information CNT indicating that the number of contiguous physical addresses included in the corresponding physical address range is 3. That is, the map data entry MAP_ENT corresponding to the sequence information SEQ 3 may indicate that it corresponds to area from physical address 50 to physical address 52, starting from physical address 50 and containing 3 contiguous physical addresses starting from physical address 50.

In some implementations, in FIG. 9, each of the plurality of map data entries MAP_ENT may further include, for example, information explicitly indicating the location of a logical address range corresponding to itself.

On the other hand, in the embodiments of the disclosed technology, the location of the logical address range corresponding to each of the plurality of map data entries MAP_ENT may be determined according to its order in the plurality of map data entries MAP_ENT. Hereinafter, this will be described with reference to FIG. 10.

Figure 10:
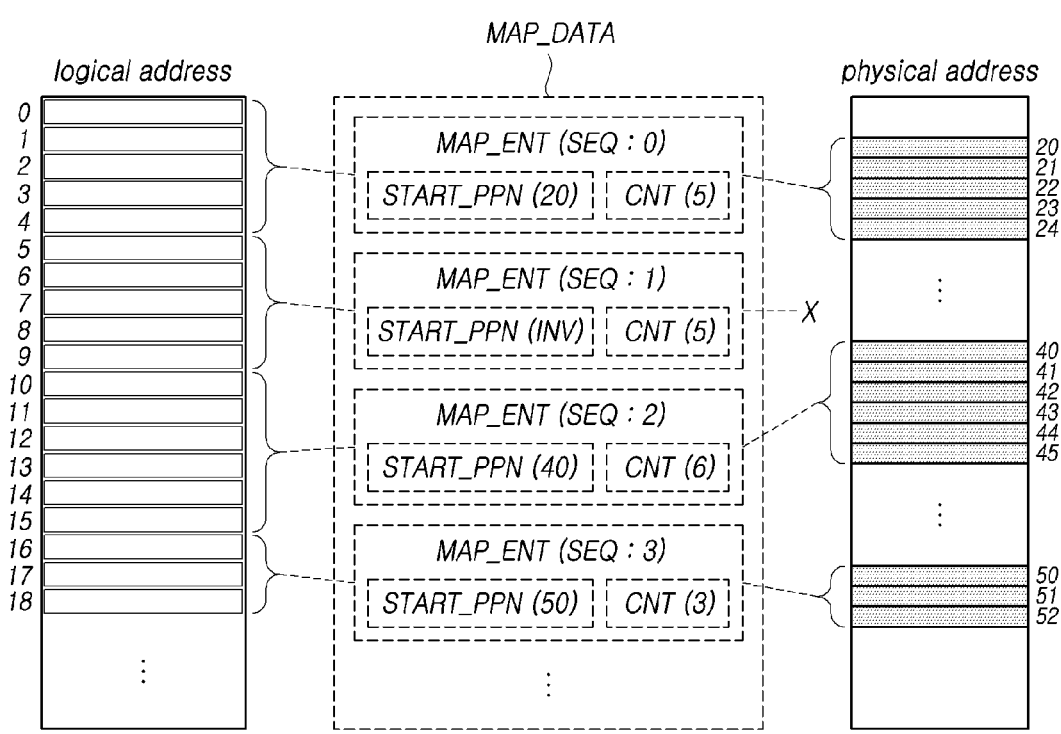
FIG. 10 illustrates an example operation for determining a logical address range corresponding to each of the plurality of map data entries based on some embodiments of the disclosed technology.

FIG. 10 illustrates an example operation for determining a logical address range corresponding to each of the plurality of map data entries MAP_ENT based on some embodiments of the disclosed technology.

Referring to FIG. 10, a starting logical address of logical address range corresponding to a target map data entry, which is one of the plurality of map data entries MAP_ENT, may be determined based on the sum of sizes of logical address ranges each corresponds to an map data entry having sequence information preceding the sequence information of the target map data entry. One map data entry having sequence information preceding the sequence information of the target map data entry means that the corresponding map data entry is accessed before the target map data entry when the operation of sequentially accessing the plurality of map data entries MAP_ENT according to sequence information is executed.

In addition, the size of the logical address range corresponding to the target map data entry may be determined based on address count information CNT included in the target map data entry.

In FIG. 10, there is no map data entry having sequence information preceding the map data entry MAP_ENT corresponding to the sequence information SEQ 0. Accordingly, the starting logical address of the logical address range corresponding to the map data entry MAP_ENT corresponding to the sequence information SEQ 0 may be determined to be 0, which is the minimum value of the logical address. In this case, the size of the logical address range corresponding to the map data entry MAP_ENT corresponding to the sequence information SEQ 0 may be determined to be 5, which is a value indicated by the address count information CNT of the corresponding map data entry.

The starting logical address of the logical address range corresponding to the map data entry MAP_ENT corresponding to the sequence information SEQ 1 may be determined to be 5, which is the size of the logical address range corresponding to the map data entry (i.e. map data entry MAP_ENT corresponding to sequence information SEQ 0) having sequence information preceding itself. In this case, the size of the logical address range corresponding to the map data entry MAP_ENT corresponding to the sequence information SEQ 1 may be determined to be 5, which is a value indicated by the address count information CNT of the corresponding map data entry.

The starting logical address of the logical address range corresponding to the map data entry MAP_ENT corresponding to the sequence information SEQ 2 may be determined to be 10 (=5+5), which is the sum of the size of the logical address ranges corresponding to the map data entry (i.e. map data entry MAP_ENT corresponding to sequence information SEQ 0 and map data entry MAP_ENT corresponding to sequence information SEQ 1) having sequence information preceding itself. In this case, the size of the logical address range corresponding to the map data entry MAP_ENT corresponding to the sequence information SEQ 2 may be determined to be 6, which is a value indicated by the address count information CNT of the corresponding map data entry.

The starting logical address of the logical address range corresponding to the map data entry MAP_ENT corresponding to the sequence information SEQ 3 may be determined to be 16 (=5+5+6), which is the sum of the size of the logical address ranges corresponding to the map data entry (i.e. map data entry MAP_ENT corresponding to sequence information SEQ 0, map data entry MAP_ENT corresponding to sequence information SEQ 1 and map data entry MAP_ENT corresponding to sequence information SEQ 2) having sequence information preceding itself. In this case, the size of the logical address range corresponding to the map data entry MAP_ENT corresponding to the sequence information SEQ 3 may be determined to be 3, which is a value indicated by the address count information CNT of the corresponding map data entry.

Figure 11:
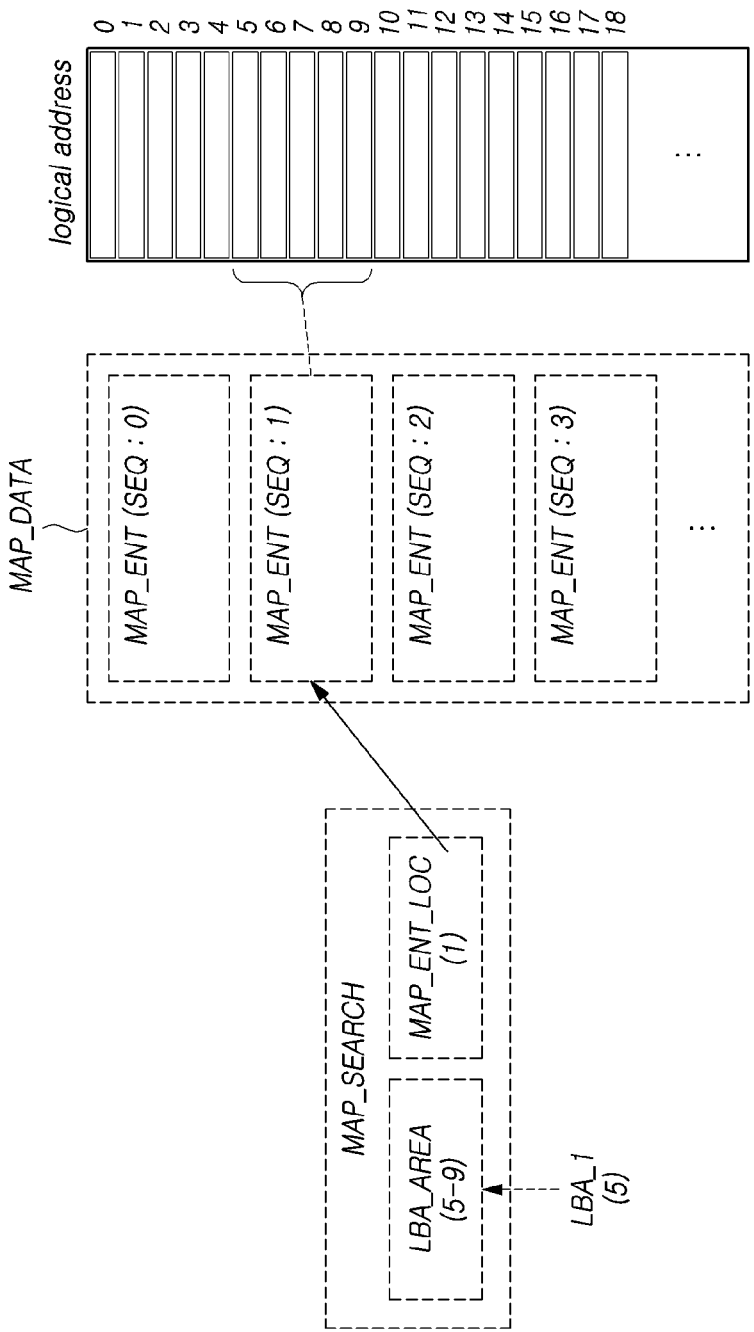
FIG. 11 illustrates an example structure of map search data based on some embodiments of the disclosed technology.

FIG. 11 illustrates an example structure of map search data MAP_SEARCH based on some embodiments of the disclosed technology.

Referring to FIG. 11, the map search data MAP_SEARCH may include information MAP_ENT_LOC indicating i) logical address range LBA_AREA including the first logical address LBA_1 and ii) map data entry, among the plurality of map data entries MAP_ENT, corresponding to the first logical address LBA_1.

For example, the map search data MAP_SEARCH may include information indicating the logical address range LBA_AREA 5-9 including the first logical address LBA_1 5. The map search data MAP_SEARCH may include information indicating that an map data entry corresponding to the first logical address LBA_1 5 is an map data entry having sequence information SEQ of 1.

Accordingly, the controller 10 may confirm, based on the map search data MAP_SEARCH, that the map data entry MAP_ENT corresponding to the first logical address LBA_1 is a map data entry whose sequence information SEQ is 1.

Figure 12:
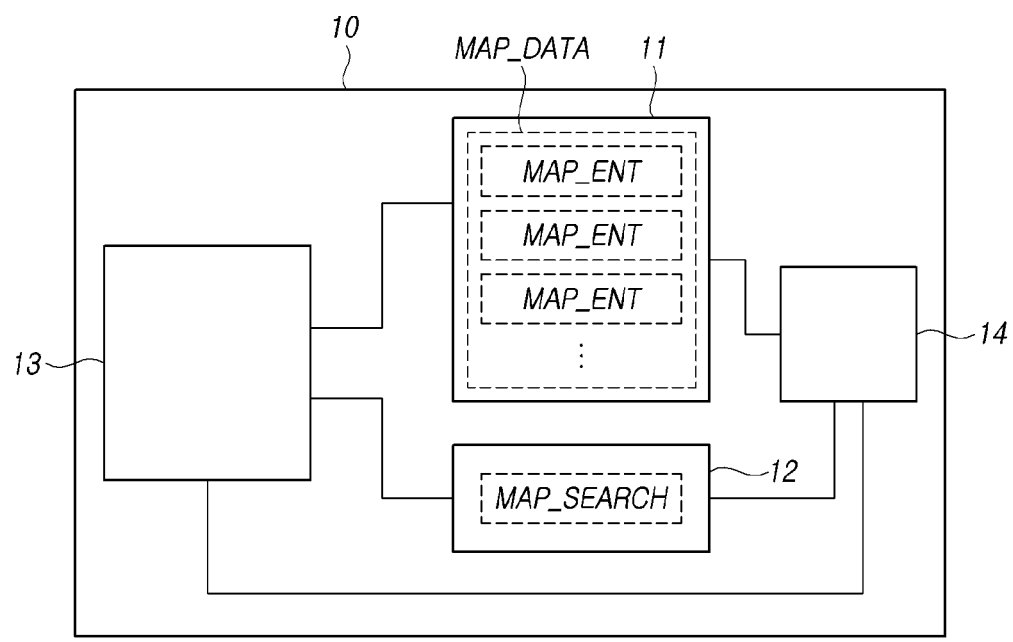
FIG. 12 illustrates another example of the controller based on some embodiments of the disclosed technology.

FIG. 12 illustrates another example of the controller 10 based on some embodiments of the disclosed technology.

Referring to FIG. 12, the controller 10 may include a map search module 14 together with the first memory 11, the second memory 12, and the core 13 described above in FIG. 4.

The map search module 14 may sequentially access one or more of the plurality of map data entries MAP_ENT according to the respective sequence information. In this way, the map search module 14 may obtain a physical address corresponding to a specific logical address.

In one example, the core 13 may control the map search module 14 to execute an operation of sequentially accessing from one or more of the plurality of map data entries MAP_ENT according to the respective sequence information, instead of directly executing the operation. To this end, for example, the core 13 may transmit a command for requesting to execute an operation of sequentially accessing from one or more of the plurality of map data entries MAP_ENT according to the respective sequence information to the map search module 14.

In some implementations, the map search module 14 may include a separate operation circuit (e.g., microprocessor) and a memory module (e.g. volatile memory, register) to access one or more of the plurality of map data entries MAP_ENT.

Figure 13:
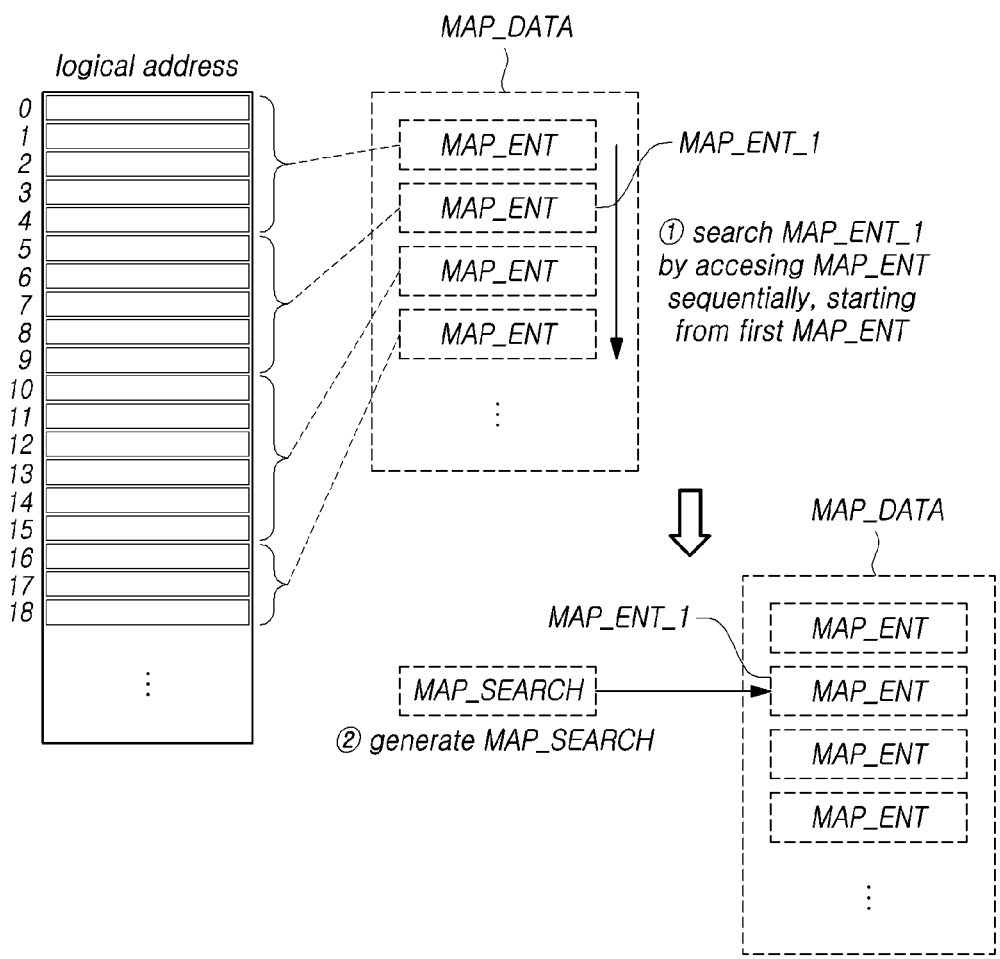
FIG. 13 illustrates an example operation of map search module described in FIG. 12.

FIG. 13 illustrates an example operation of map search module 14 described in FIG. 12.

Referring to FIG. 13, the map search module 14 may search for a first map data entry MAP_ENT_1 corresponding to the first logical address LBA_1 by accessing sequentially according to the respective sequence information from an map data entry, among the plurality of map data entries MAP_ENT, corresponding to the sequence information with the highest priority (e.g., sequence information the smallest value or the largest number) ("①" in FIG. 13).

The map search module 14 may generate the map search data MAP_SEARCH indicating the searched first map data entry MAP_ENT_1 ("②" in FIG. 13).

As described above, the map search module 14 may access one or more of the plurality of map data entries MAP_ENT according to sequence information corresponding to each of the plurality of map data entries MAP_ENT.

The core 13 may also access one or more of the plurality of map data entries MAP_ENT according to sequence information corresponding to each of the plurality of map data entries MAP_ENT.

Therefore, the core 13 directly executes or controls the map search module 14 to execute an operation of sequentially accessing one or more of the plurality of map data entries MAP_ENT according to sequence information corresponding to each of the plurality of map data entries MAP_ENT. Hereinafter, this will be described in detail with reference to FIGS. 14 to 15.

Figure 14:
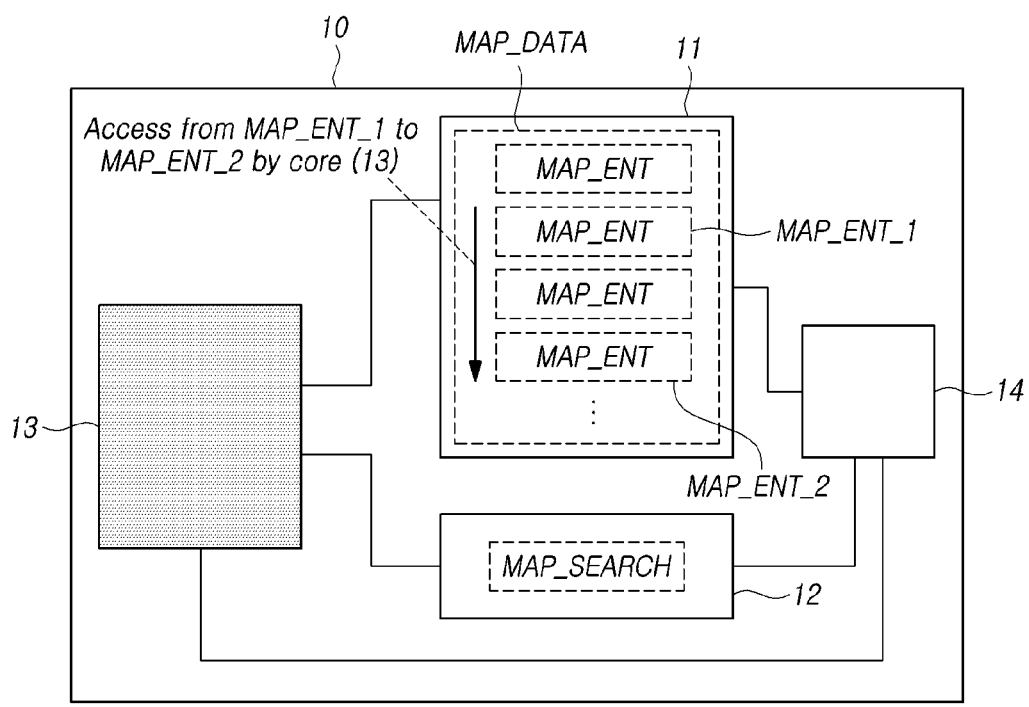
FIG. 14 illustrates an example operation of the controller for accessing one or more of the plurality of map data entries based on some embodiments of the disclosed technology.

FIG. 14 illustrates an example operation of the controller 10 for accessing one or more of the plurality of map data entries MAP_ENT based on some embodiments of the disclosed technology.

Referring to FIG. 14, the core 13 of the controller 10 may directly execute an operation of sequentially accessing from the first map data entry MAP_ENT_1 to the second map data entry MAP_ENT_2 among the plurality of map data entries MAP_ENT according to the respective sequence information.

In this case, the core 13 may directly access the first memory 11 in which the plurality of map data entries MAP_ENT are stored and the second memory 12 in which map search data MAP_SEARCH indicating the first map data entry MAP_ENT_1 is stored.

Figure 15:
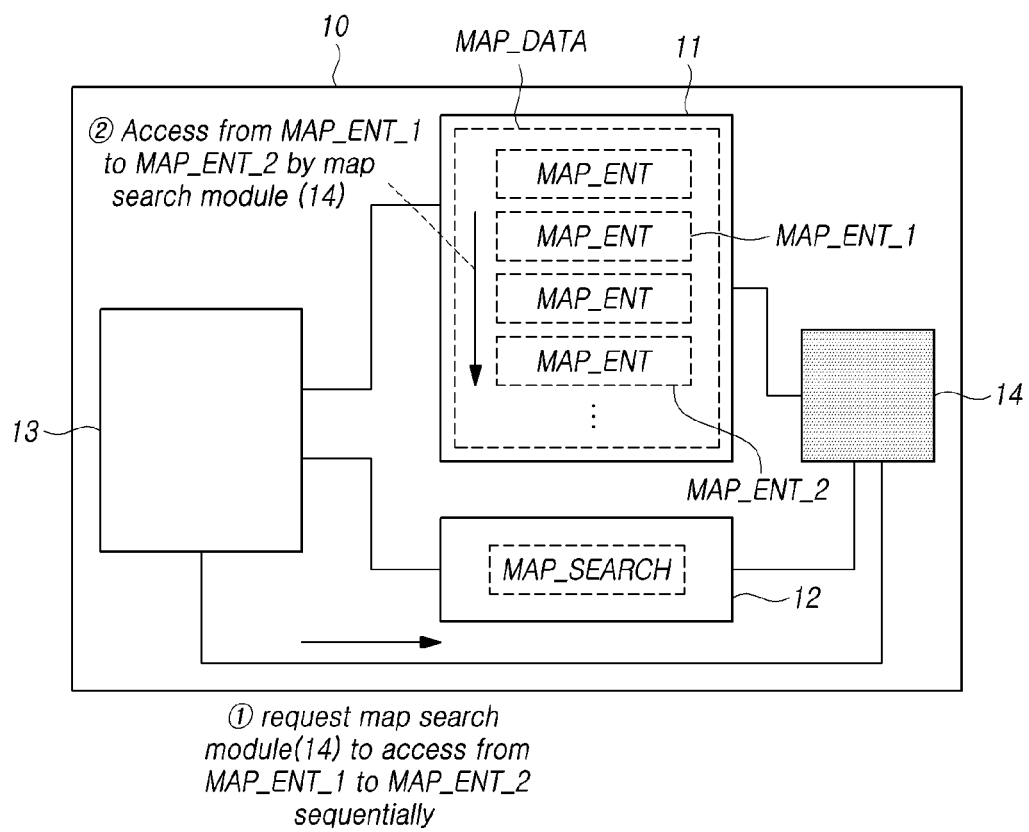
FIG. 15 illustrates another example operation of the controller for accessing one or more of the plurality of map data entries based on some embodiments of the disclosed technology.

FIG. 15 illustrates another example operation of the controller 10 for accessing one or more of the plurality of map data entries MAP_ENT based on some embodiments of the disclosed technology.

Referring to FIG. 15, the core 13 of the controller 10 may request the map search module 14 to execute an operation of sequentially accessing from the first map data entry MAP_ENT_1 to the second map data entry MAP_ENT_2 among the plurality of map data entries MAP_ENT according to the respective sequence information ("①" in FIG. 15). To this end, the core 13 may transmit a command or signal to the map search module 14.

The map search module 14 may execute, after receiving request from the core 13, execute an operation of sequentially accessing from the first map data entry MAP_ENT_1 to the second map data entry MAP_ENT_2 among the plurality of map data entries MAP_ENT according to respective sequence information ("②" in FIG. 15).

As will be discussed below with reference to FIGS. 16 and 17, the core 13 determines the entity that executes the operation of sequentially accessing one or more of the plurality of map data entries MAP_ENT according to sequence information corresponding to each of the plurality of map data entries MAP_ENT as the core 13 or the map search module 14.

Figure 16:
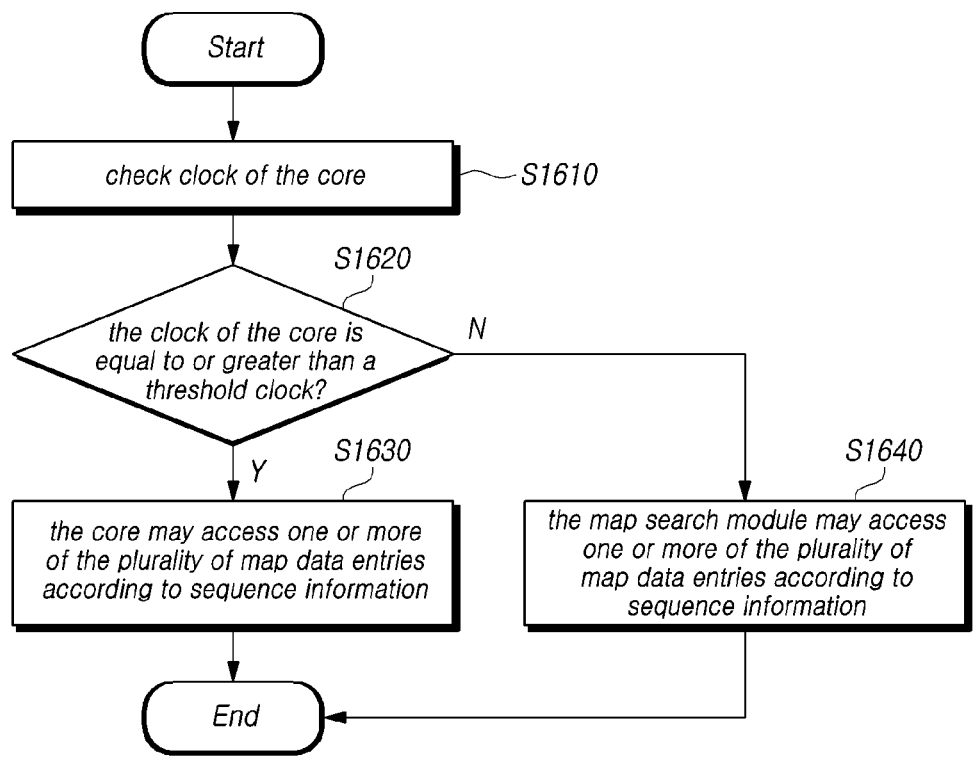
FIG. 16 illustrates an example method of the controller for determining which element accesses one or more of the plurality of map data entries based on some embodiments of the disclosed technology.

FIG. 16 illustrates an example method of the controller 10 for determining which element accesses one or more of the plurality of map data entries MAP_ENT based on some embodiments of the disclosed technology.

Referring to FIG. 16, the core 13 of the controller 10 may check clock of the core 13 (S1610).

The core 13 may determine whether the clock of the core 13 is equal to or greater than a preset threshold clock (S1620).

When the clock of the core is equal to or greater than the threshold clock (S1620—Y), the core 13 may directly execute an operation of sequentially accessing one or more of the plurality of map data entries MAP_ENT according to sequence information corresponding to each of the plurality of map data entries MAP_ENT (S1630).

When the operation speed of the core 13 is fast, it is more efficient for the core 13 to directly access the plurality of map data entries MAP_ENT to obtain a value of physical address mapped to logical address than obtaining the value of physical address mapped to the logical address using the map search module 14.

On the other hand, when the clock of the core is less than the threshold clock (S1620—N), the map search module 14 may execute an operation of sequentially accessing one or more of the plurality of map data entries MAP_ENT according to sequence information corresponding to each of the plurality of map data entries MAP_ENT (S1640).

When the operation speed of the core 13 is slow, processing of other operations controlled by the core 13 may be delayed since the core 13 directly accesses the plurality of map data entries MAP_ENT and spends a lot of time to obtain the value of the physical address mapped to the logical address, and as a result, there is a risk that the performance of the controller 10 is degraded.

Figure 17:
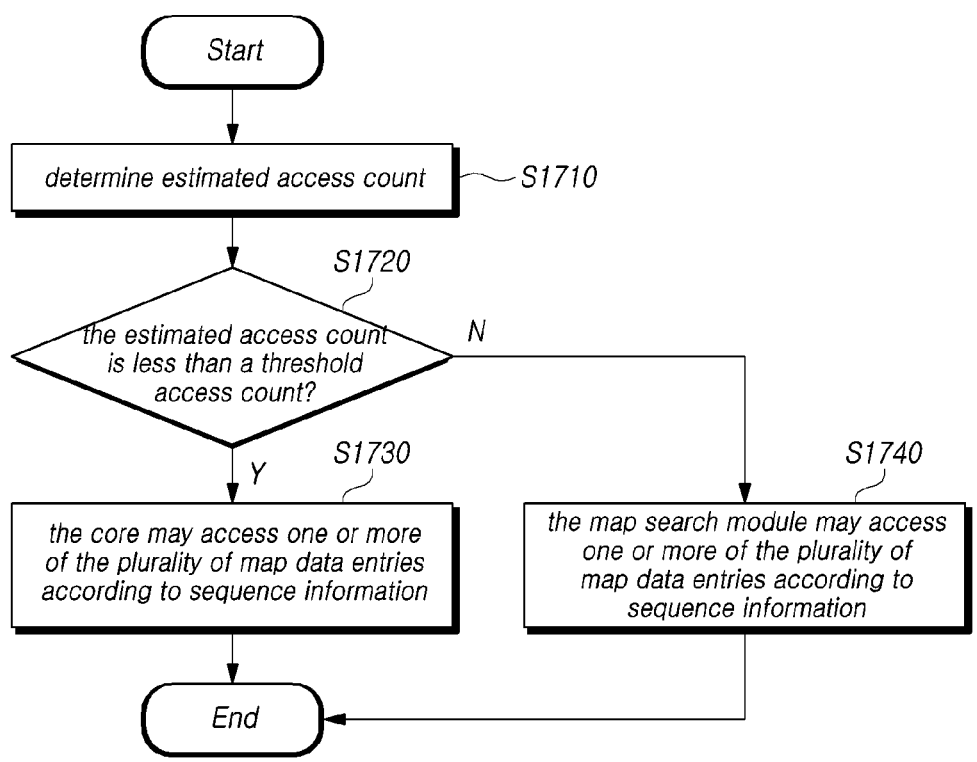
FIG. 17 illustrates another example method of the controller for determining which element accesses one or more of the plurality of map data entries based on some embodiments of the disclosed technology.

FIG. 17 illustrates another example method of the controller 10 for determining which element accesses one or more of the plurality of map data entries MAP_ENT based on some embodiments of the disclosed technology.

Referring to FIG. 17, the core 13 of the controller 10 may determine estimated access count, which is estimated number of map data entries to be accessed by the core 13 or the map search module 14 to obtain a physical address corresponding to the second logical address LBA_2 (S1710).

The core 13 may determine whether the estimated access count is less than a threshold access count (S1720).

When the estimated access count is less than the preset threshold access count (S1720—Y), the core 13 may directly execute an operation of sequentially accessing one or more of the plurality of map data entries MAP_ENT according to sequence information corresponding to each of the plurality of map data entries MAP_ENT (S1730).

In this case, the time required for the core 13 to access the plurality of map data entries MAP_ENT is small. Therefore, the core 13 may acquire the physical address corresponding to the second logical address LBA_2 faster than requesting the map search module 14 to obtain the physical address corresponding to the second logical address LBA_2 and waiting for response from the map search module 14.

On the other hand, when the estimated access count is greater than or equal to the threshold access count (S1720—N), the map search module 14 may execute an operation of sequentially accessing one or more of the plurality of map data entries MAP_ENT according to sequence information corresponding to each of the plurality of map data entries MAP_ENT (S1740).

In this case, the time required for the core 13 to access the plurality of map data entries MAP_ENT is large. Therefore, if the core 13 accesses the plurality of map data entries MAP_ENT directly, processing of other operations controlled by the core 13 may be delayed, and as a result, there is a risk that the performance of the controller may be degraded.

In some implementations, the aforementioned estimated access count may be determined in various ways.

For example, the core 13 may determine the estimated access count based on difference between the first logical address LBA_1 and the second logical address LBA_2. In this case, the estimated access count may be proportional to the difference between the first logical address LBA_1 and the second logical address LBA_2.

For another example, the core 13 may determine the estimated access count based on i) the difference between the first logical address LBA_1 and the second logical address LBA_2 and ii) the maximum value of the size of the logical address range corresponding to one of the plurality of map data entries MAP_ENT. In this case, the estimated access count may be proportional to the difference between the first logical address LBA_1 and the second logical address LBA_2 and inversely proportional to the maximum value of the size of the logical address range corresponding to one of the plurality of map data entries MAP_ENT.

Figure 18:
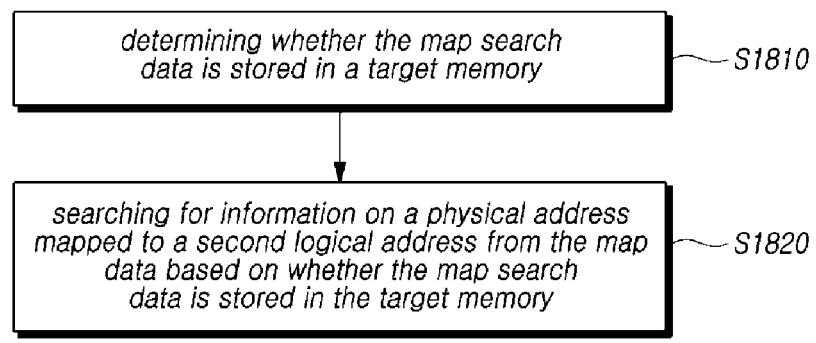
FIG. 18 illustrates an operating method of the controller based on some embodiments of the disclosed technology.

FIG. 18 illustrates an operating method of the controller 10 based on some embodiments of the disclosed technology.

Referring to FIG. 18, the operating method of the controller 10 may include determining whether the map search data MAP_SEARCH, indicating a first map data entry MAP_ENT_1 corresponding to a first logical address LBA_1 in an map data MAP_DATA including a plurality of map data entries MAP_ENT, is stored in a target memory (S1810). The target memory may be the above-described second memory 12.

In this case, each of the plurality of map data entries MAP_ENT may correspond to sequence information SEQ indicating its sequence among the plurality of map data entries MAP_ENT.

Each of the plurality of map data entries MAP_ENT may indicate a corresponding logical address range, which includes one or more contiguous logical address, is mapped to a physical address range, which includes one or more contiguous physical address, or not mapped to any physical address range.

The operating method of the controller 10 may include searching for information on a physical address mapped to a second logical address LBA_2 from the map data MAP_DATA, based on whether the map search data MAP_SEARCH is stored in the target memory (S1820).

In this case, the searching for information on a physical address mapped to the second logical address LBA_2 from the map data MAP_DATA may include executing, when the map search data MAP_SEARCH is stored in the target memory, a logical operation to control an operation for accessing, among the plurality of map data entries MAP_ENT, map data entries from the first map data entry MAP_ENT_1 to a second map data entry MAP_ENT_2, which corresponds to the second logical address LBA_2, sequentially according to respective sequence information SEQ.

The searching for information on a physical address mapped to the second logical address LBA_2 from the map data MAP_DATA may include executing, when the map search data MAP_SEARCH is not stored in the target memory, a logical operation to control an operation for accessing, among the plurality of map data entries MAP_ENT, map data entries from an map data entry corresponding to the sequence information with the highest priority (e.g., sequence information the smallest value or the largest number) sequentially according to respective sequence information SEQ.

In some implementations, each of the plurality of map data entries MAP_ENT may include i) physical location information START_PPN indicating validity of physical address range corresponding to itself and the starting physical address and ii) address count information CNT indicating the number of contiguous physical addresses included in the physical address range corresponding to itself.

In this case, a starting logical address of logical address range corresponding to a target map data entry, which is one of the plurality of map data entries MAP_ENT, may be determined based on the sum of sizes of logical address ranges each corresponds to an map data entry having sequence information preceding the sequence information of the target map data entry. The size of logical address range corresponding to the target map data entry may be determined based on the address count information CNT included in the target map data entry.

In some implementations, the map search data MAP_SEARCH may include information indicating i) logical address range including the first logical address LBA_1 and ii) map data entry, among the plurality of map data entries MAP_ENT, corresponding to the first logical address LBA_1.

In some implementations, the operating method of the controller 10 may further include executing a logical operation to control an operation for accessing one or more of the plurality of map data entries MAP_ENT sequentially according to respective sequence information to generate the map search data MAP_SEARCH.

In some implementations, the operation S1820 may further include executing, when the map search data MAP_SEARCH is stored in the target memory and the operation of searching for information on the physical address mapped to the second logical address LBA_2 from the map data MAP_DATA fails, a logical operation to control an operation for accessing sequentially according to the respective sequence information map data entries MAP_ENT from an map data entry corresponding to the sequence information with the highest priority (e.g., sequence information the smallest value or the largest number).

In some implementations, the operation S1820 may include controlling, when the map search data MAP_SEARCH is stored in the target memory, the core 13 included in the controller 10 or the map search module 14 included in the controller 10 to execute an operation of sequentially accessing from the first map data entry MAP_ENT_1 to the second map data entry MAP_ENT_2 according to respective sequence information.

For example, the operation S1820 may control, when clock of the core 13 is equal to or greater than a threshold clock, the core 13 to execute an operation of sequentially accessing from the first map data entry MAP_ENT_1 to the second map data entry MAP_ENT_2 according to respective sequence information. The operation S1820 may control, when clock of the core 13 is less than the threshold clock, the map search module 14 to execute an operation of sequentially accessing from the first map data entry MAP_ENT_1 to the second map data entry MAP_ENT_2 according to respective sequence information.

For another example, the operation S1820 may include i) determining estimated access count, which is estimated number of map data entries from the first map data entry MAP_ENT_1 to the second map data entry MAP_ENT_2, and ii) controlling the core 13 to execute, when the estimated access count is less than a threshold access count, an operation of sequentially accessing from the first map data entry MAP_ENT_1 to the second map data entry MAP_ENT_2 according to respective sequence information and controlling the map search module 14 to execute, when the estimated access count is greater than or equal to the threshold access count, to execute an operation of sequentially accessing from the first map data entry MAP_ENT_1 to the second map data entry MAP_ENT_2 according to respective sequence information.

In this case, the estimated access count may be determined based on the difference between the first logical address LBA_1 and the second logical address LBA_2.

Figure 19:
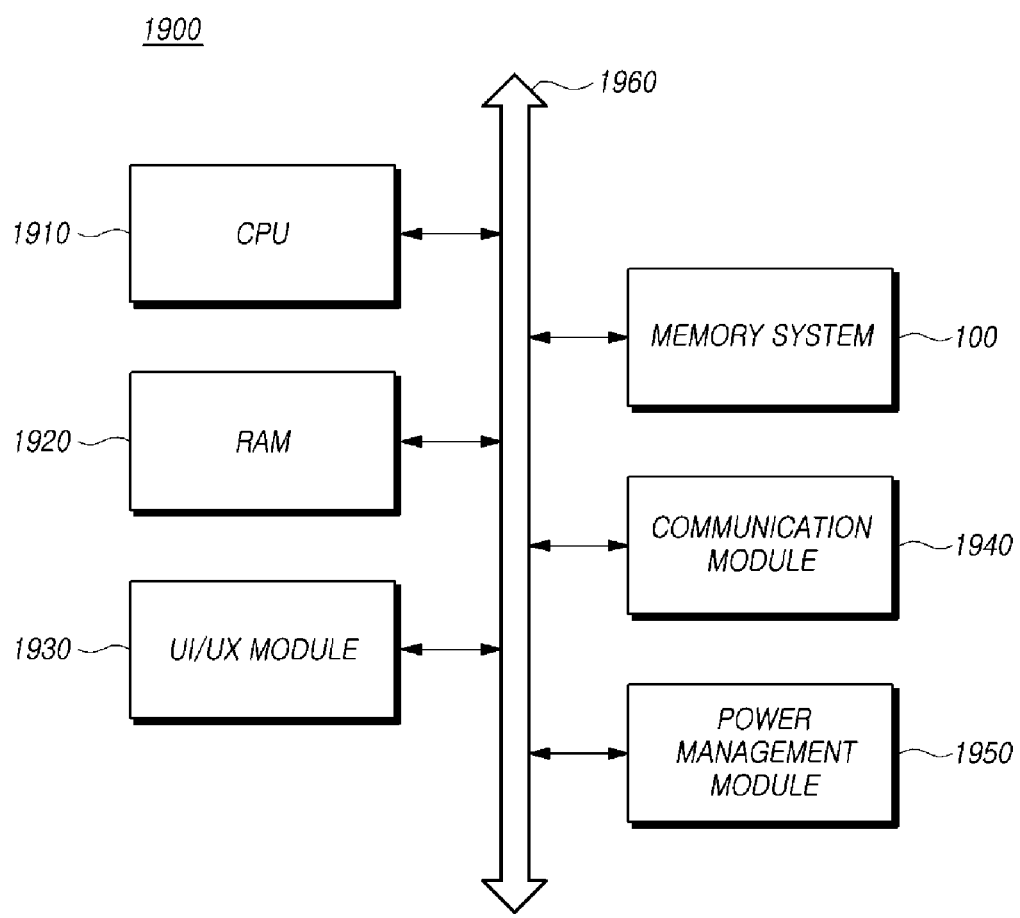
FIG. 19 is a diagram illustrating an example configuration of a computing system based on some embodiments of the disclosed technology.

FIG. 19 is a diagram illustrating the configuration of a computing system 1900 based on an embodiment of the disclosed technology.

Referring to FIG. 19, the computing system 1900 based on an embodiment of the disclosed technology may include: a memory system 100 electrically connected to a system bus 1960; a CPU 1910 configured to control the overall operation of the computing system 1900; a RAM 1920 configured to store data and information related to operations of the computing system 1900; a user interface/user experience (UI/UX) module 1930 configured to provide the user with a user environment; a communication module 1940 configured to communicate with an external device as a wired and/or wireless type; and a power management module 1950 configured to manage power used by the computing system 1900.

The computing system 1900 may be a personal computer (PC) or may include a mobile terminal such as a smartphone, a tablet or various electronic devices.

The computing system 1900 may further include a battery for supplying an operating voltage, and may further include an application chipset, a graphic-related module, a camera image processor, and a DRAM.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized.

Only a few embodiments and examples are described. Enhancements and variations of the disclosed embodiments and other embodiments can be made based on what is described and illustrated in this patent document.

What is claimed is:

1. A controller comprising:
a first memory configured to store data comprising map data which includes a plurality of map data entries, wherein each of the plurality of map data entries corresponds to a number indicating an order of each map data entry in a sequence of the plurality of map data entries, wherein each of the plurality of map data entries indicates (1) one logical address or a plurality of contiguous logical addresses that are mapped to one physical address or a plurality of contiguous physical addresses or (2) the one logical address and the plurality of contiguous logical addresses are not mapped to any physical address;
a second memory configured to store map search data which is data indicating a first map data entry among the plurality of map data entries; and
a core in communication with the first memory and the second memory and configured to look up a physical address mapped to a second logical address from the map data stored in the first memory, based on whether the map search data indicating the first map data entry is stored in the second memory,
wherein the core, upon determination that the map search data indicating the first map data entry is stored in the second memory, sequentially accesses one or more of the plurality of map data entries, starting from the first map data entry to a second map data entry corresponding to the second logical address, and
wherein the core, upon determination that the map search data indicating the first map data entry is not stored in the second memory, sequentially accesses one or more of the plurality of map data entries, starting from a map data entry corresponding to a smallest number among numbers that indicate the order of the plurality of map data entries.

2. The controller of claim 1,
wherein each of the plurality of map data entries includes physical location information and address count information, wherein the physical location information indicates a validity of a physical address range corresponding to the physical location information and a starting physical address, and the address count information indicates a number of contiguous physical addresses included in the physical address range corresponding to the physical location information.

3. The controller of claim 2,
wherein a starting logical address of a logical address range corresponding to a target map data entry of the plurality of map data entries is determined based on a sum of sizes of logical address ranges corresponding to map data entries associated with numbers indicating the order of the plurality of map data entries that precede a number of the target map data entry indicating the order of the target map data entry, and
wherein a size of the logical address range corresponding to the target map data entry is determined based on the address count information included in the target map data entry.

4. The controller of claim 1,
wherein the map search data indicating the first map data entry is generated by sequentially accessing one or more of the plurality of map data entries, starting from a map data entry corresponding to the smallest number among the numbers that indicate the order of the plurality of map data entries.

5. The controller of claim 1,
wherein the core, upon determination that the map search data indicating the first map data entry is stored in the second memory and an operation of searching for information on the physical address mapped to the second logical address from the map data fails, sequentially accesses one or more of the plurality of map data entries, starting from a map data entry corresponding to the smallest number among the numbers that indicate the order of the plurality of map data entries.

6. The controller of claim 1,
wherein the controller further comprises a map search module configured to sequentially access one or more of the plurality of map data entries according to the number indicating the order of each map data entry in the sequence of the plurality of map data entries.

7. The controller of claim 6,
wherein the core controls the map search module, upon determination that the map search data indicating the first map data entry is stored in the second memory, to sequentially access one or more of the plurality of map data entries starting from the first map data entry to the second map data entry.

8. The controller of claim 7,
wherein the core, upon determination a clock value of the core is equal to or greater than a preset threshold clock value associated with an operation speed of the core, sequentially accesses one or more of the plurality of map data entries starting from the first map data entry to the second map data entry, and
wherein the core controls the map search module, upon determination that a clock value of the core is less than the threshold clock value associated with the operation speed of the core, to sequentially access one or more of the plurality of map data entries starting from the first map data entry to the second map data entry.

9. The controller of claim 7,
wherein the core determines an access count corresponding to a number of map data entries from the first map data entry to the second map data entry,
wherein the core, upon determination that the access count is less than a preset threshold access count, sequentially accesses one or more of the plurality of map data entries starting from the first map data entry to the second map data entry, and
wherein the core controls the map search module, upon determination that the access count is greater than or equal to the threshold access count, to sequentially access one or more of the plurality of map data entries starting from the first map data entry to the second map data entry.

10. The controller of claim 9,
wherein the core determines the access count based on a difference between the first logical address and the second logical address.

11. A method for operating a controller, the method comprising:
determining whether map search data indicating a first map data entry of a plurality of map data entries is stored in a target memory; and
searching for information on a physical address mapped to a second logical address from the plurality of map data entries, based on whether the map search data indicating the first map data entry is stored in the target memory, wherein each of the plurality of map data entries corresponds to a number indicating an order of each map data entry in a sequence of the plurality of map data entries, and wherein each of the plurality of map data entries indicates (1) one logical address or a plurality of contiguous logical addresses that are mapped to one physical address or a plurality of contiguous physical addresses or (2) the one logical address and the plurality of contiguous logical addresses are not mapped to any physical address, wherein the searching further comprises:

upon determination that the map search data indicating the first map data entry is stored in the target memory, sequentially accessing one or more of the plurality of map data entries, starting from the first map data entry to a second map data entry corresponding to the second logical address; and upon determination that the map search data indicating the first map data entry is not stored in the target memory, sequentially accessing one or more of the plurality of map data entries, starting from a map data entry corresponding to a smallest number among numbers that indicate the order of the plurality of map data entries.

12. The method of claim 11, wherein each of the plurality of map data entries includes physical location information and address count information, wherein the physical location information indicates a validity of a physical address range corresponding to the physical location information and a starting physical address, and the address count information indicates a number of contiguous physical addresses included in the physical address range corresponding to the physical location information.

13. The method of claim 12, wherein a starting logical address of a logical address range corresponding to a target map data entry of the plurality of map data entries is determined based on a sum of sizes of logical address ranges corresponding to map data entries associated with numbers indicating the order of the plurality of map data entries that precede a number of the target map data entry indicating the order of the target map data entry, and wherein a size of the logical address range corresponding to the target map data entry is determined based on the address count information included in the target map data entry.

14. The method of claim 11, further comprising:

generating the map search data indicating the first map data entry by sequentially accessing one or more of the plurality of map data entries.

15. The method of claim 11, wherein the searching further comprises:

upon determination that the map search data indicating the first map data entry is stored in the target memory and the searching for information on the physical address mapped to the second logical address from the map data fails, starting from a map data entry corresponding to the smallest number among the numbers that indicate the order of the plurality of map data entries, sequentially accessing one or more of the plurality of map data entries.

16. The method of claim 11, wherein the searching further comprises:

controlling, upon determination that the map search data indicating the first map data entry is stored in the target memory, a core included in the controller or a map search module included in the controller to sequentially access one or more of the plurality of map data entries, starting from the first map data entry to the second map data entry.

\* \* \* \* \*